(12) United States Patent
Gevaert

(10) Patent No.: US 7,578,243 B2
(45) Date of Patent: Aug. 25, 2009

(54) LAPTOP COMPUTER BIN ASSEMBLY FOR A WORKSURFACE

(75) Inventor: Steven C. Gevaert, Green Bay, WI (US)

(73) Assignee: Krueger International, Inc., Green Bay, WI (US)

( * ) Notice: Subject to any disclaimer, the term of this patent is extended or adjusted under 35 U.S.C. 154(b) by 426 days.

(21) Appl. No.: 11/278,896

(22) Filed: Apr. 6, 2006

(65) Prior Publication Data

US 2006/0226742 A1    Oct. 12, 2006

Related U.S. Application Data

(60) Provisional application No. 60/669,042, filed on Apr. 7, 2005.

(51) Int. Cl.
*A47B 81/00* (2006.01)
(52) U.S. Cl. ............ 108/25; 312/223.3; 108/50.02
(58) Field of Classification Search ............ 312/223.3, 312/196, 208.1, 312, 24–30; 108/25, 26, 108/50.01, 50.02
See application file for complete search history.

(56) References Cited

U.S. PATENT DOCUMENTS

| | | | | | |
|---|---|---|---|---|---|
| 408,385 | A | * | 8/1889 | Kiefer | 312/25 |
| 943,794 | A | * | 12/1909 | Schrunner | 312/312 |
| 993,588 | A | * | 5/1911 | Donning | 312/26 |
| 1,207,400 | A | * | 12/1916 | Harris | 312/26 |
| 1,565,247 | A | * | 12/1925 | Axen | 312/23 |
| 2,125,777 | A | * | 8/1938 | Estrates et al. | 312/23 |
| 2,411,221 | A | * | 11/1946 | McGuire | 312/272.5 |
| 2,775,781 | A | * | 1/1957 | Morgan | 16/86 C |
| 3,393,029 | A | * | 7/1968 | Ellis | 312/25 |
| 4,426,122 | A | * | 1/1984 | Lainez et al. | 361/679.55 |
| 4,695,104 | A | * | 9/1987 | Lederman | 312/223.3 |
| 4,828,342 | A | | 5/1989 | Stefan | |
| 5,005,669 | A | * | 4/1991 | Umebara et al. | 186/61 |
| 5,242,217 | A | | 9/1993 | Gonnet | |
| 5,526,756 | A | | 6/1996 | Watson | |
| 5,797,666 | A | | 8/1998 | Park | |
| 5,931,549 | A | * | 8/1999 | Lindberg | 312/223.3 |

(Continued)

FOREIGN PATENT DOCUMENTS

RU           2094007      * 10/1997

(Continued)

*Primary Examiner*—Janet M Wilkens
(74) *Attorney, Agent, or Firm*—Andrus, Sceales, Starke & Sawall, LLP

(57) ABSTRACT

A bin assembly capable of being secured to a work surface such as a table top includes an enclosure secured to the work surface. A platform and an elevating mechanism, which is capable of moving the platform vertically, are contained within the enclosure. The assembly also includes a cover pivotally secured over the enclosure and connected to the elevating mechanism for selectively operating the elevating mechanism, to elevate and lower the platform within the enclosure simultaneously with the movement of the cover to retract and expose an item, such as a laptop computer, positioned on the platform. The cover can be locked in the closed position by a locking mechanism engaged between the cover and the enclosure to secure the item within the assembly. The cover can also be locked in the open position by a lock bracket releasably engaged with the cover in the open position to prevent inadvertent closing of the cover.

17 Claims, 10 Drawing Sheets

U.S. PATENT DOCUMENTS

| | | | |
|---|---|---|---|
| 6,012,788 A | 1/2000 | Marschand et al. | |
| 6,556,678 B1 | 4/2003 | Boyce | |
| 6,585,214 B1 * | 7/2003 | Dittmer | 248/370 |
| 6,733,094 B1 | 5/2004 | Chang | |
| 6,802,577 B2 * | 10/2004 | Gershfeld | 312/223.3 |
| 7,100,516 B2 * | 9/2006 | Riddiford et al. | 108/50.01 |
| 2002/0101139 A1 | 8/2002 | Lee | |
| 2006/0061942 A1 * | 3/2006 | Abel et al. | 361/636 |
| 2008/0072803 A1 * | 3/2008 | Korber et al. | 108/50.01 |

FOREIGN PATENT DOCUMENTS

| | | | |
|---|---|---|---|
| WO | 2006009531 | * | 1/2006 |

* cited by examiner

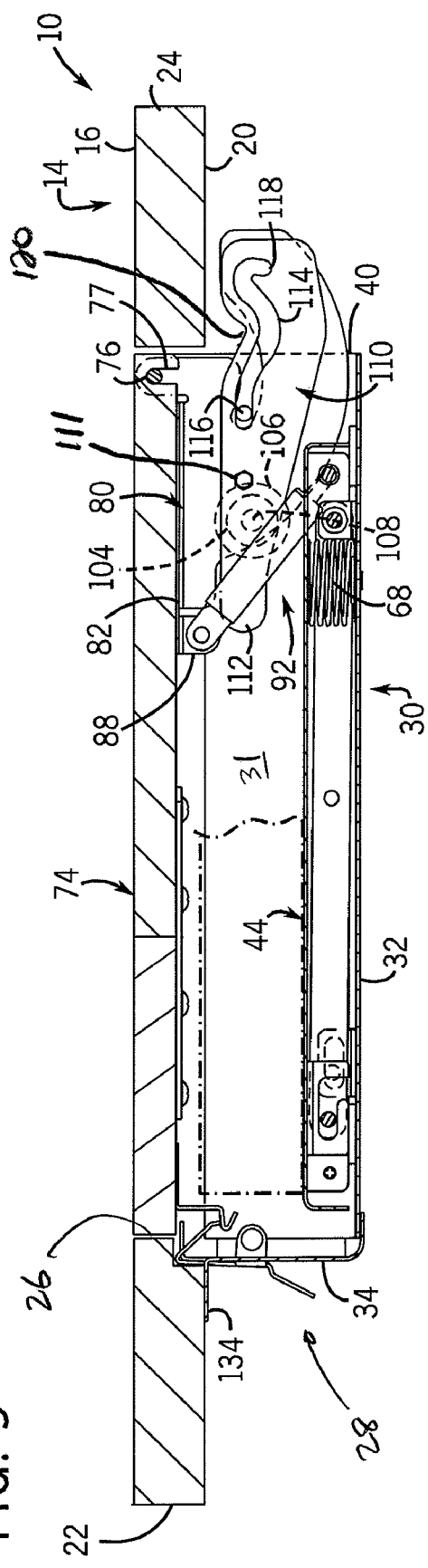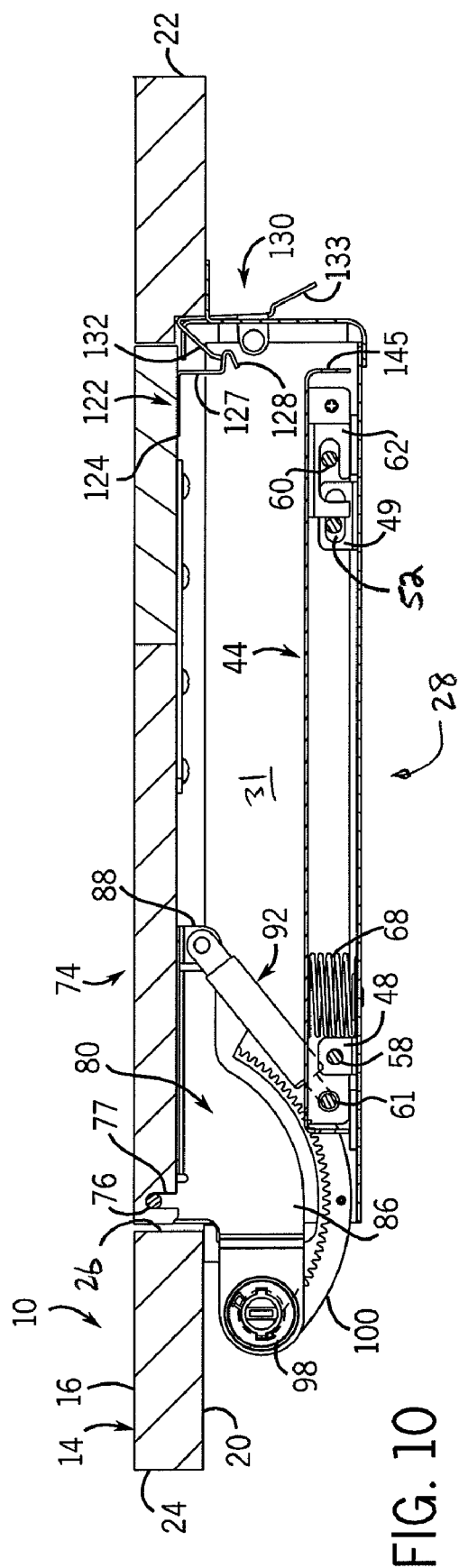

LAPTOP COMPUTER BIN ASSEMBLY FOR A WORKSURFACE

CROSS-REFERENCE TO RELATED APPLICATIONS

This application claims the benefit of U.S. Provisional Patent Application Ser. No. 60/669,042, filed Apr. 7, 2005, which is incorporated by reference herein in its entirety.

FIELD OF THE INVENTION

The present invention relates to work surfaces, and more specifically to a bin assembly for use with a work surface which is capable of selectively enclosing and exposing items, such as a computing device, from within the work surface.

BACKGROUND OF THE INVENTION

Tables, desks and work stations have been modified in their construction in order to more readily accommodate computing devices such as desktop and laptop computers. While advancements in computer technology have resulted in a reduction in the size of computers, such devices still occupy significant space on a desk or table top when being used. Oftentimes it is necessary to remove a computer from the desk or table top in order to enable an individual to effectively utilize the area of the desk or table top.

To avoid this problem, a number of prior art desks and tables have been developed in which the various portions of a computer can be selectively elevated above or lowered beneath the surface of the desk or table. Examples of such desks and tables are illustrated in U.S. Pat. Nos. 5,242,217, 5,797,666, 6,012,788, and 6,733,094, which are incorporated by reference herein. These prior art patents illustrate various desks and tables in which one or multiple parts of the desk or table can be moved generally vertically relative to the remainder of the working surface, in order to selectively expose a compartment containing a component of the computer, e.g., a monitor. When the compartment is exposed, the computer can be utilized in a conventional fashion. Further, when the compartment is in the retracted or stored position, the entire working surface area of the desk or table can be utilized for any desired purpose since the compartment and the computer component contained therein are entirely positioned beneath the surface of the desk or table.

However, each of these tables or desks involves a relatively complex construction in order to accommodate the particular elevating mechanism and/or object retaining structure. Therefore, the costs and time required for the production of such desks or tables is quite high. Also, due to the significant number of components required, the maintenance and repair costs for such desks and tables are also significantly higher than the costs associated with conventional desks and tables that are used for supporting computers.

Therefore, it is desirable to provide a structure for use with a desk or table top which is capable of concealing a computing device within the desk or table structure, and which does not require that the desk or table be constructed in a manner significantly different than conventional furniture items of this type. Further, the structure utilized with the desk or table should be entirely self-contained, such that the structure can be incorporated into existing desks or tables in a manner that enables the desk or table to function normally, while also allowing the desk or table to provide a compartment for selectively storing and displaying the computing device.

SUMMARY OF THE INVENTION

According to one aspect of the present invention, a bin assembly for selectively displaying and storing an item or items, such as a laptop or notebook computer, from within a work surface includes a base or enclosure formed of a generally rigid material that is securable directly below an opening formed in a the work surface, which may be a desktop or tabletop, among other suitable surfaces. The base supports an elevating mechanism on a bottom wall, which in turn movably supports a platform. The platform is movable with respect to the base by the elevating mechanism from an elevated position in which the platform is positioned adjacent an upper end of the work surface, to a retracted position in which the platform is positioned below the work surface adjacent the bottom wall. Thus, when a laptop computer or other similar device is positioned on the platform, the mechanism can be operated to either lift the computer to an exposed position in which the computer can be utilized by an individual seated at the desk or table, or to lower the computer completely within the enclosure for containment therein.

According to another aspect of the present invention, in order to retain and enclose the computer within the enclosure when the platform is in the retracted position, the bin assembly further includes a cover pivotally secured to and over the enclosure. The cover is formed of a single panel or multiple, interconnected panels that can be moved between an open position, in which the panel is positioned away from the enclosure, and a closed position, in which the panel is disposed directly over the enclosure. In the closed position, the panel is positioned flush with the work surface, i.e., the top of the table or desk, such that the cover forms a virtually seamless extension of the work surface, enabling an individual to utilize the entire work surface of the table or desk, as desired. Also, the cover includes a separate lifting or elevating mechanism connected between the cover and the platform to assist in moving the platform between the elevated and retracted positions. The cover can additionally include a movement controlling mechanism to control the speed at which the platform is raised and lowered and at which the cover is opened and closed.

According to still another aspect of the present invention, the cover also includes a latch that is releasably engageable with a handle positioned on the exterior of the enclosure, in order to secure the cover in the closed position over the enclosure. The latch and handle can be further engaged with a locking mechanism that prevents disengagement of the latch from the handle without first operating the locking mechanism, to ensure that a laptop computer or other device positioned within the enclosure is only accessible by an individual having a key or other appropriate means to operate the locking mechanism. Alternatively, the locking mechanism can be positioned on the enclosure without a handle, such as in a location that can only be accessed using a particular device or signal.

According to a further aspect of the present invention, the cover can be secured or locked in the open position by a lock member that is pivotally interconnected with the cover, e.g. to a hinge bracket to which the cover is mounted. When the cover is moved to the open position, the lock member pivots along with the cover and the hinge bracket. The lock member includes a groove or channel, and a stationary pin rides in the groove or channel when the cover is being opened. The groove or channel includes a retainer area that is configured to prevent movement of the pin within the groove or channel when the cover is fully opened, to prevent the cover from being pivoted toward the closed position until the lock bracket has been manually moved to disengage the pin from the retainer area of the groove or channel. Upon disengagement, the cover and the lock bracket can both be moved into the closed position over the enclosure of the bin assembly.

According to yet another aspect of the present invention, the bin assembly is capable of being formed with or secured to a work surface, such as either during original construction of the desk or table, or after the initial construction in a retrofit manner.

According to still a further object of the present invention, the bin assembly has a simple construction that reduces the overall cost and time necessary to construct the assembly and to install the assembly into the work surface.

Numerous additional aspects, features and advantages of the present invention will be made apparent from the following detailed description taken together with the drawing figures.

BRIEF DESCRIPTION OF THE DRAWINGS

The drawings illustrate the best mode currently contemplated of carrying out the present invention.

In the drawings:

FIG. 9 is a cross-sectional view along line 9-9 of FIG. 2;

FIG. 10 is a cross-sectional view along line 10-10 of FIG. 2;

DETAILED DESCRIPTION OF THE INVENTION

Figure 1:
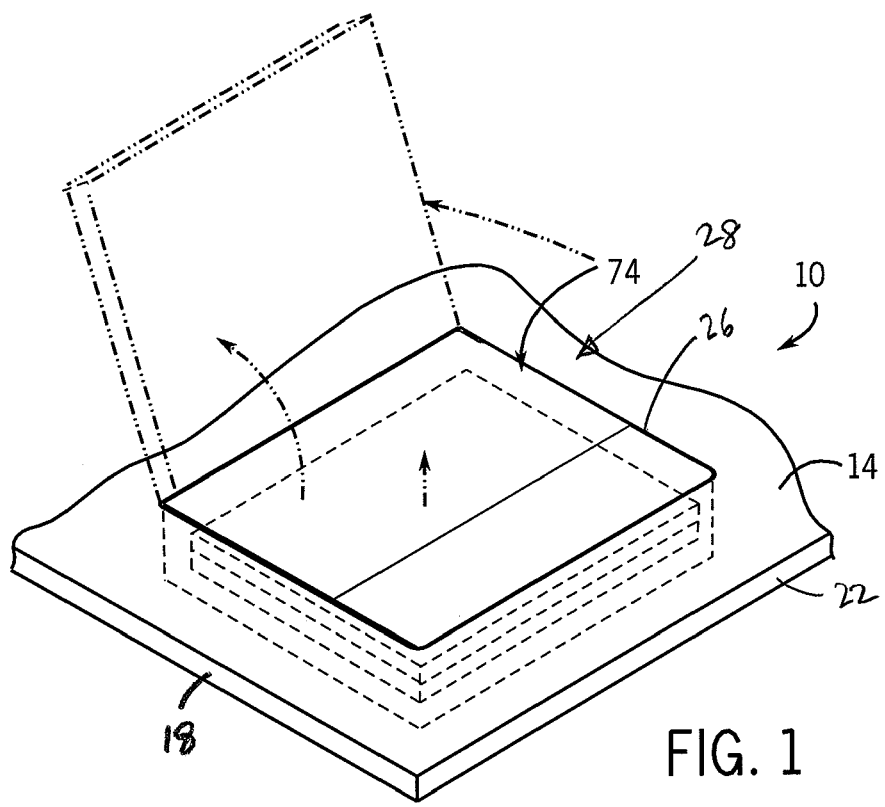
FIG. 1 is an isometric view of a portion of a work surface incorporating a bin assembly of the present invention.
Figure 9A:
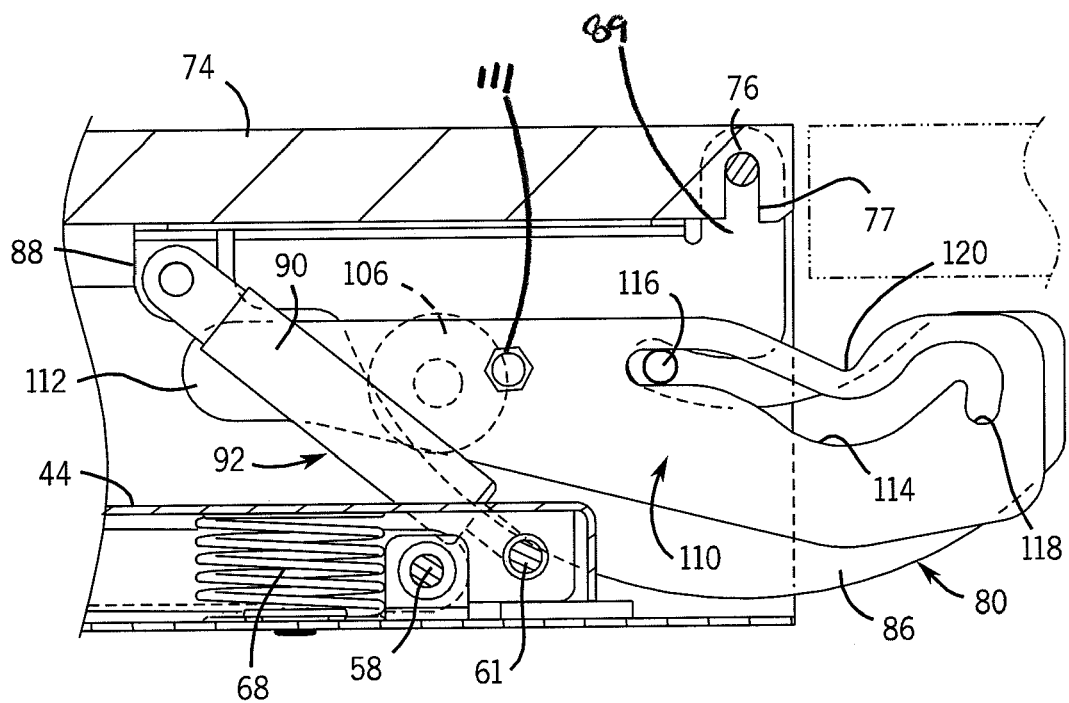
FIG. 9A is an enlarged partial section view of a portion of the bin assembly as shown in FIG. 9.

With reference now to the drawing figures in which like reference numerals designate like parts throughout the disclosure, a bin assembly constructed according to the present invention is indicated generally at 28 in FIGS. 1-10. The bin assembly 28 includes an enclosure 30 formed of a generally rigid material, such as a metal or hard plastic, and having an open interior 31, a bottom wall 32, a front wall 34 joined to the bottom wall 32, and a pair of side walls 36, 38 joined to the bottom wall 32 and each extending rearwardly from the front wall 34. The enclosure 30 can be formed in any satisfactory manner such that each of the respective walls 32-38 are connected with one another. Representatively, the bottom wall 32 and the side walls 36 and 38 may be formed together, and the front wall 34 may be formed separately and then assembled to bottom wall 32 and side walls 36, 38 to form the enclosure 30. In addition, the enclosure 30 defines an open rear end 40 opposite the front wall 34 and between the sidewalls 36, 38 to reduce the weight of the enclosure 30 and to provide access for cords, wires and cables (not shown) into the interior 31 of the enclosure 30. The open rear end 40 also allows any liquids that are inadvertently spilled into the enclosure 30 to easily and quickly flow out of the enclosure 30 without causing significant damage to the components of the assembly 28 or to any equipment contained within the enclosure 30.

Looking now at FIGS. 1, 2, and 5-8, a support, such as a table or desk 10 is shown that includes a base (not shown) that is positionable on a support surface such as a floor (not shown), and a desktop or work surface 14 secured to the base. The work surface 14 can have any desired shape according to user requirements, and may be generally rectangular in shape having an upper surface 16, a pair of side surfaces 18 and a lower surface 20, which define a front end 22 and rear end 24. The work surface 14 can be formed from any desired material, as long as the material forming the work surface 14 is sufficiently rigid to withstand the environment in which the desk 10 is used. The work surface 14 may be formed of a relatively rigid material, such as a hard plastic, or a metal, wood or composite material, in a manner as is known. These types of materials allow the work surface 14 to be painted, laminated, coated, or otherwise modified in appearance to provide a table or desk having a desired appearance. It is also understood that reference numeral 14 may simply denote a section of a larger desktop or tabletop within which bin assembly 28 may be secured, and that any number of bin assemblies 28 may be incorporated in such a desktop or tabletop.

The work surface 14 defines an inner opening 26 that is located in any desired position, e.g. toward front end 22. Opening 26 may be generally rectangular in shape. However, it should be understood that opening 26 can also be positioned in any desired location on the work surface 14, and can have any desired shape compatible with the bin assembly 28.

The enclosure 30 is secured around the opening 26 of the work surface 14 by a number of fasteners 42 inserted through bores 43 formed within outwardly extending flanges 134, 136, 138 disposed on each enclosure wall 34-38, respectively, and which are positioned opposite the bottom wall 32. The flanges 134, 136, 138 are positioned against the lower surface 20 of the work surface 14 around the periphery of the opening 26 such that the bores 43 face the lower surface 20. The fasteners 42 inserted through the bores 43 can be screws or any other suitable fasteners, and extend into the work surface 14 a sufficient distance to securely hold the enclosure 30 in place below the opening 26.

Referring now to FIGS. 3-10, a platform 44 is positioned within the interior 31 of the enclosure 30. The platform 44 is formed of a generally rigid material, such as metal or a hard plastic, and has a shape generally similar to the shape of the enclosure 30 when viewed in plan. The platform 44 includes a central support surface 45 and a downturned peripheral edge 145 extending around the platform 44. A pair of cut-out sections 146 are also formed on the support surface 45 adjacent the open rear end 40 of the enclosure 30.

Figure 4:
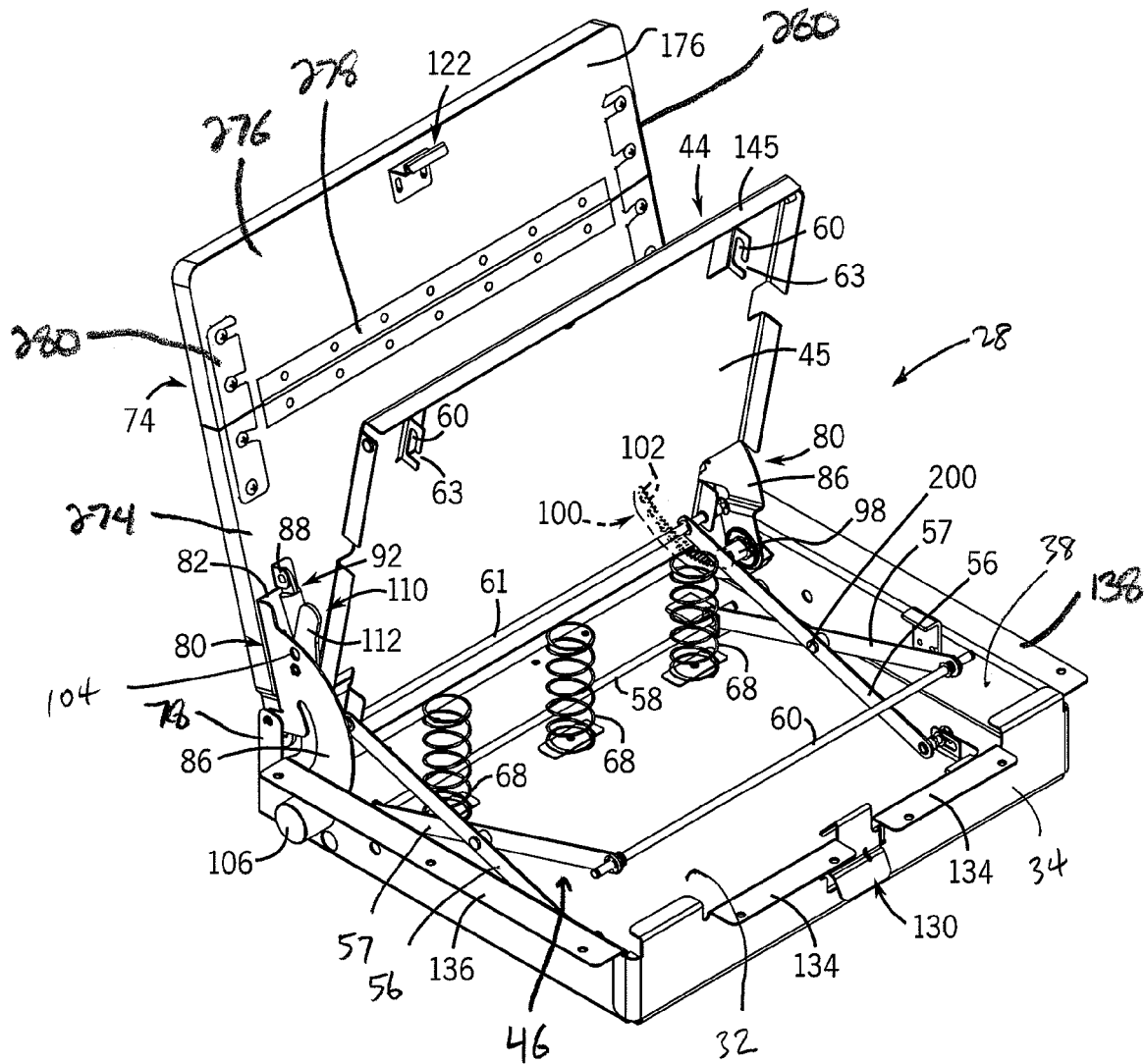
FIG. 4 is an isometric view similar to FIG. 2, showing the bin assembly in the open configuration and the platform member of the assembly pivoted to a raised position.
Figure 5:
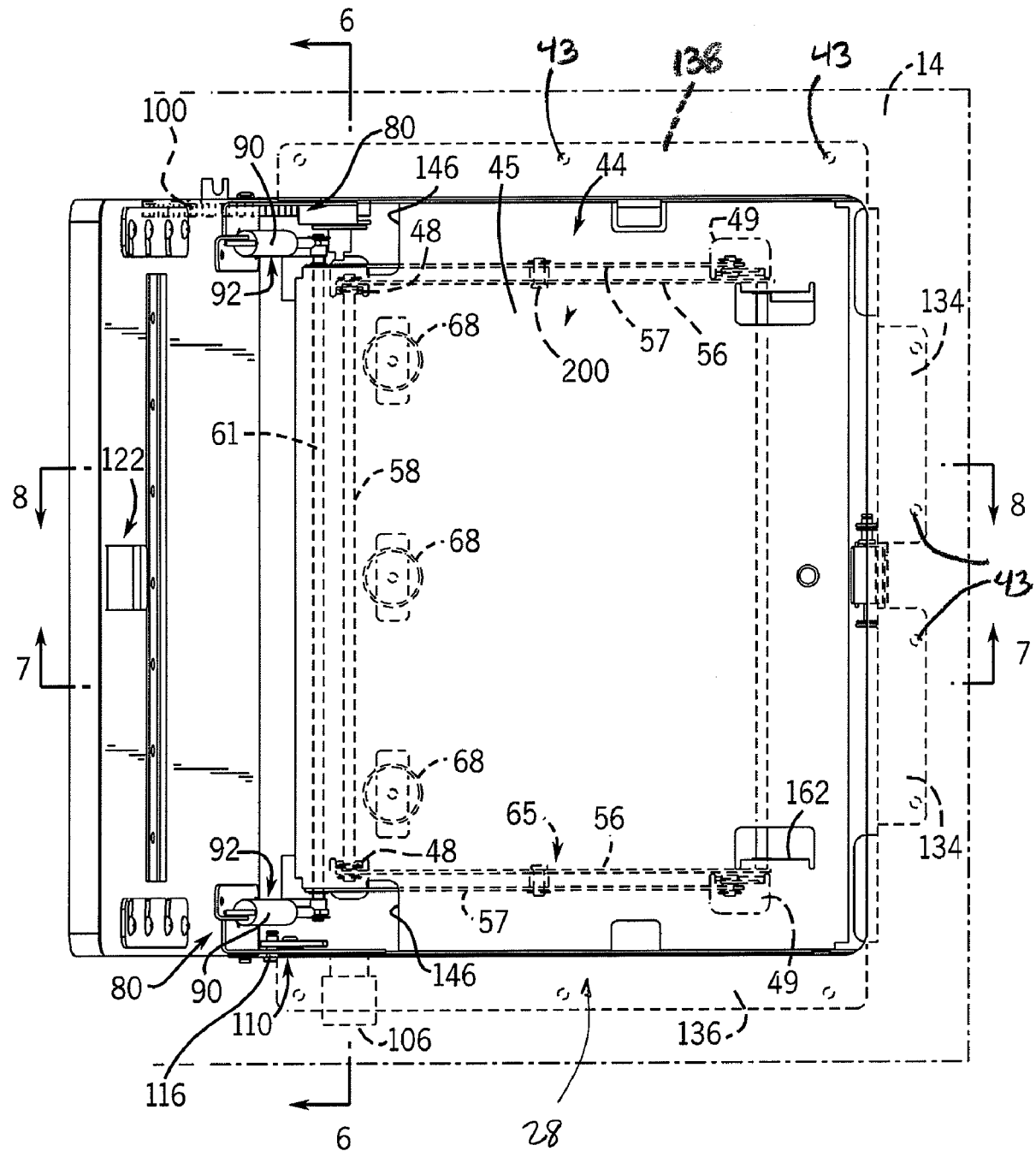
FIG. 5 is a top plan view of the bin assembly of FIG. 3.
Figure 6:
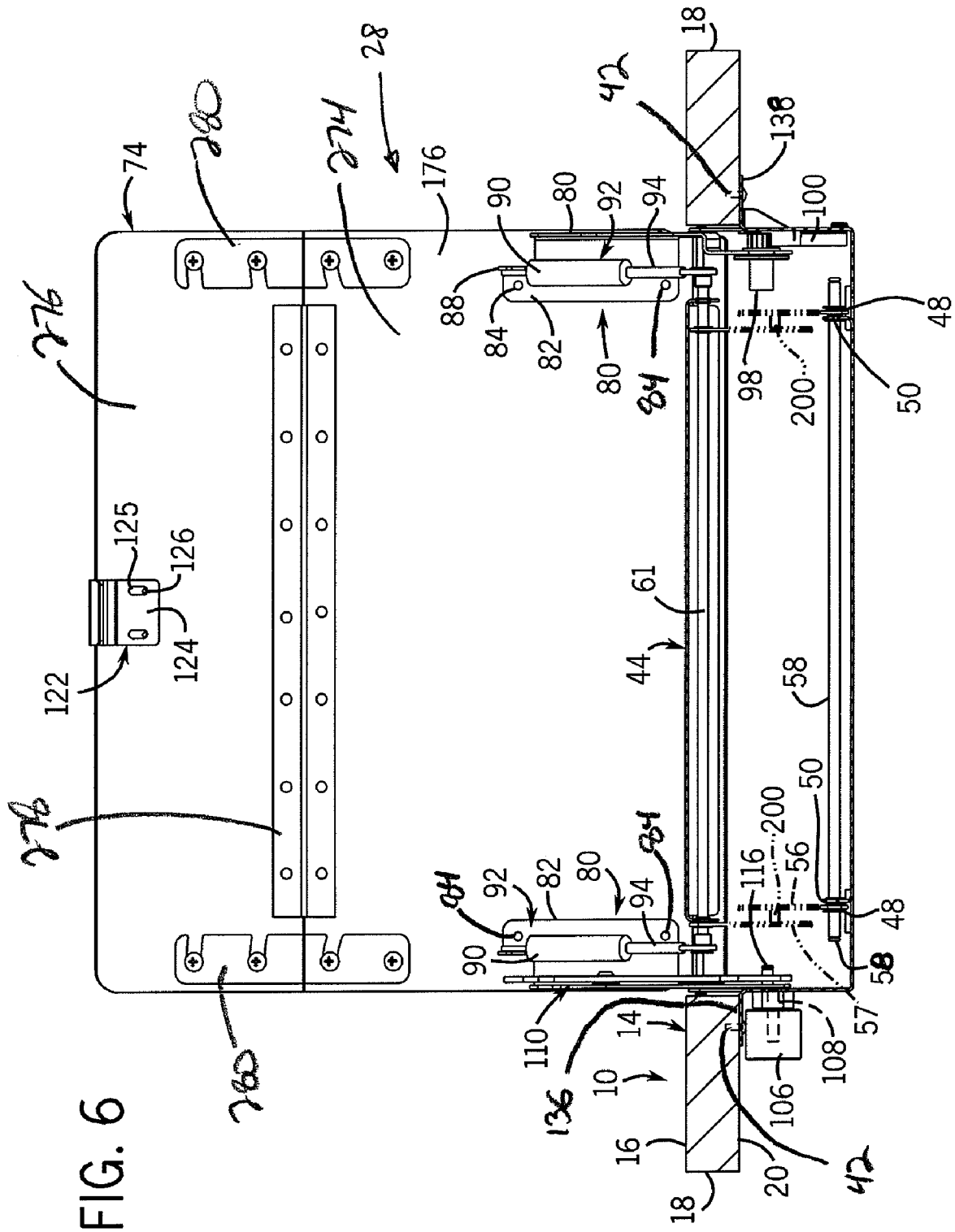
FIG. 6 is a cross-sectional view along line 6-6 of FIG. 5.
Figure 8:
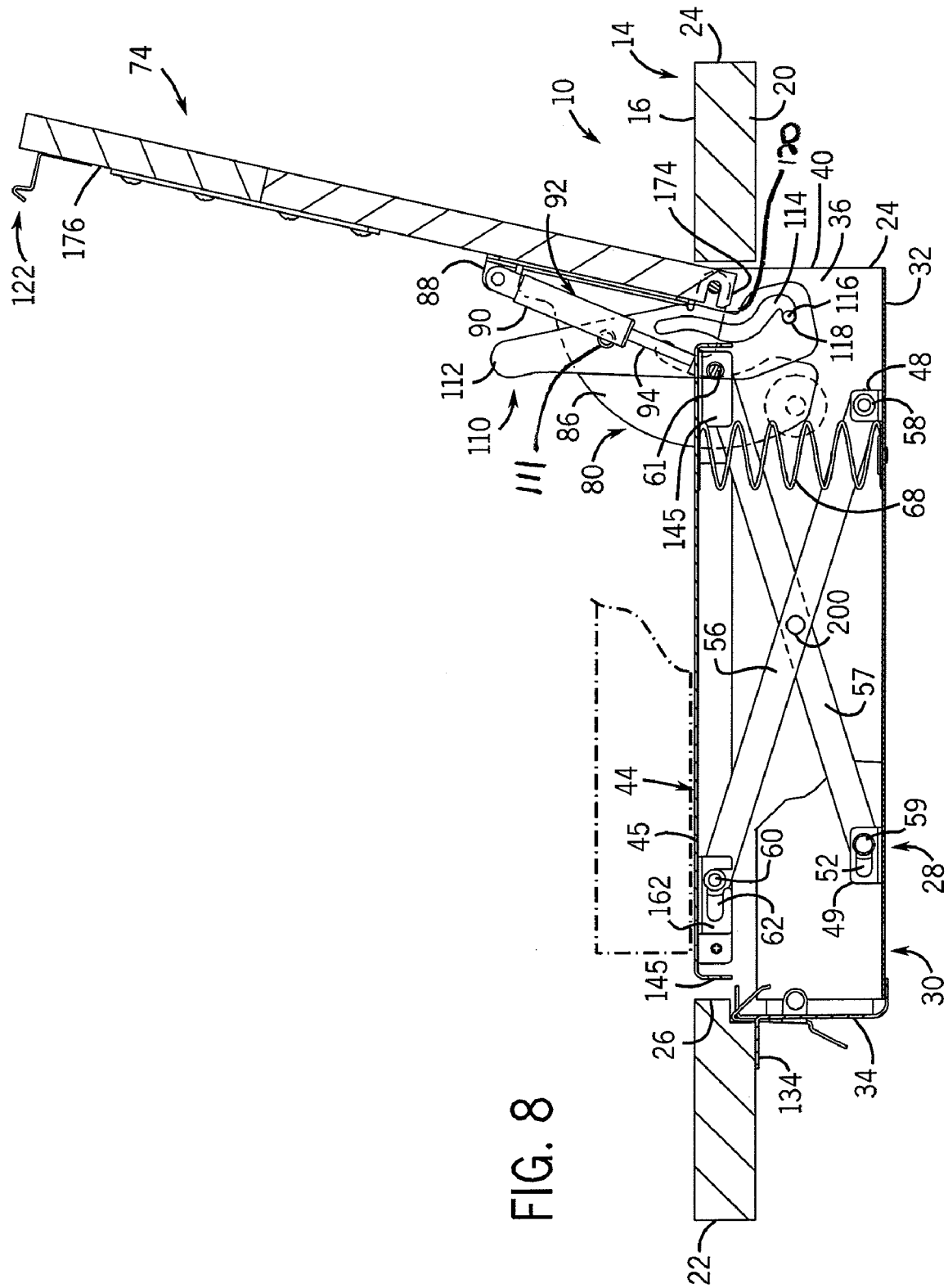
FIG. 8 is a cross-sectional view along line 8-8 of FIG. 5.

An elevating mechanism 46 is positioned within the interior of the enclosure 30 along with the platform 44. The elevating mechanism 46 includes a pair of base member brackets 48, 49 disposed adjacent each sidewall 36, 38 of the enclosure 30. Each base member bracket 48 is affixed to the bottom wall 32 near the open rear end 40 and includes an aperture 50, while each base member 49 is secured to the bottom wall 32 near the front wall 34 and includes a slot 52. First and second lifting arms 56 and 57, respectively, are secured to the base member brackets 48, 49. As best shown in FIGS. 4, 5, and 8, first lifting arm 56 is pivotally secured to the base member bracket 48 by a pivot rod 58 extending between the lifting arm 56 and the aperture 50, and second lifting arm 57 is pivotally and slidably secured to the slot 52 in the base member bracket 49 by a pivot pin 59 extending between the second arm 57 and the slot 52.

Opposite the base member brackets 48, 49, each of the lifting arms 56 and 57 is also pivotally secured to the platform 44. The first lifting arm 56 is pivotally and slidably secured to the platform 44 via a pivot rod 60 that is slidably and pivotally connected to the platform 44 in a corresponding slot 62 formed in a slot bracket 162 secured to the underside of the platform 44. The slot 62 includes an open end 63 that allows the pivot rod 60 to be disengaged from the slot 62, as best shown in FIG. 4. The second lifting arm 57 is also pivotally secured to the platform 44 by a pivot rod 61 mounted within an aperture 64 in the peripheral edge 145 of the platform 44. Thus, the lifting arms 56, 57, which are connected between each of the base member brackets 48, 49 and each side of the platform 44 and to one another via rods 200, form scissor linkages 65 capable of raising and lowering the platform 44 with respect to the bottom wall 32. The pivot rods 58, 60 and 61 are preferably formed as elongated rods that extend across the platform 44 to connect the linkages 65 together and to the enclosure 30 and the platform 44, as shown in the drawing figures, but can also be formed as pairs of pins similar to pins 59, with each pair located on opposite sides of the enclosure to secure one linkage 65 to either the enclosure 30 or the platform 44. Referring to FIG. 4, the platform 44 can be pivoted to a raised position, to provide access to the area below platform 44 for cleaning or any other desired purpose.

A movement control system 66 is interconnected with platform enclosure 30 and platform 44, for controlling the movement of platform 44 between the open and closed positions. The movement control system 66 includes a number of springs 68 positioned between the bottom wall 32 and central support surface 45 of the platform 44 between the cutout sections 146 adjacent the open rear end 40 of the enclosure 30. The springs 68 bias the platform 44 and the scissor linkages 65 to an extended or raised position to automatically elevate the platform 44 in conjunction with the movement of the assembly 28 to the open position. However, other suitable and well-known mechanisms (not shown) can be substituted for the springs 68.

To facilitate the opening of the assembly 28, and to assist the movement of the platform 44 between the elevated and retracted positions, the assembly 28 includes a cover 74 for the enclosure 30 that can be moved between an open position (FIG. 8) and a closed position (FIG. 9). The cover 74 is pivotally attached to the enclosure 30 and can be formed of any suitable rigid material, and is preferably formed of a material similar or identical to the material utilized to form the work surface 14, such that the outward appearance of the cover 74 matches the work surface 14. Thus, the cover 74 can provide the appearance of a generally continuous upper surface 16 for the work surface 14 when the cover 74 is in the closed position.

In a particularly preferred embodiment, the cover 74 is pivotally connected to the enclosure 30 by a rod 76 secured between a pair of upwardly extending tabs 78 integrally formed with each side wall 36, 38 generally opposite the front wall 34. Between the tabs 78, the rod 76 is positioned within a pair of notches 77 disposed adjacent a rear end 174 of the cover 74, which can rotate with respect to the rod 76.

Referring to FIGS. 3-10, to assist in controlling the movement of the cover 74 between the open and closed positions, a pair of hinge brackets 80 are affixed to a lower surface 176 of the cover 74 near the rear end 174. Each hinge bracket 80 includes an engagement portion 82 fixedly connected to the lower surface 176 of the cover 74 by fasteners 84, and a guide portion 86 extending perpendicularly from the engagement portion 82. As shown in FIG. 9A, the engagement portion 82 of the bracket 80 includes a flange 89 that can be pivotally connected to the rod 76 adjacent the tabs 78 on the side walls 36 and 38 of the enclosure 30. The engagement portion 82 of each bracket 80 also includes a small flange 88 spaced generally opposite the flange 89 and inwardly from the rear end 174.

The movement control system 66 also includes a pair of gas spring assemblies 92, each of which has a cylinder portion 90 that is pivotally connected to the flange 88 of one of the hinge brackets 80. Each gas spring assembly 92 also includes a rod portion 94 slidably connected to the cylinder portion 90 and pivotally connected to one end of the pivot rod 61 extending across the platform 44 adjacent the open rear end 40. The gas spring assemblies 92 are preferably formed to be biased toward the extended position, in which each rod portion 94 is fully extended from within the cylinder portion 90. In this manner, when the cover 74 is moved from the closed position toward the open position, the gas spring assemblies 92 operate to assist in pushing the cover 74 away from the platform 44. This also pulls the pivot rod 61 and the platform 44 into the elevated position by virtue of the connection of the gas spring assemblies 92 between the cover 74 and the platform 44 via the pivot rod 61.

The arcuate guide portion 86 of each hinge bracket 80 extends into the cutout sections 146 formed in the rear section of the platform 44. Thus, when the cover 74 is pivoted between the open and closed configurations, the guide portions 86 of each hinge bracket 80 move freely with respect to the platform 44 within the cutout sections 146 formed in the platform 44.

Figure 7:
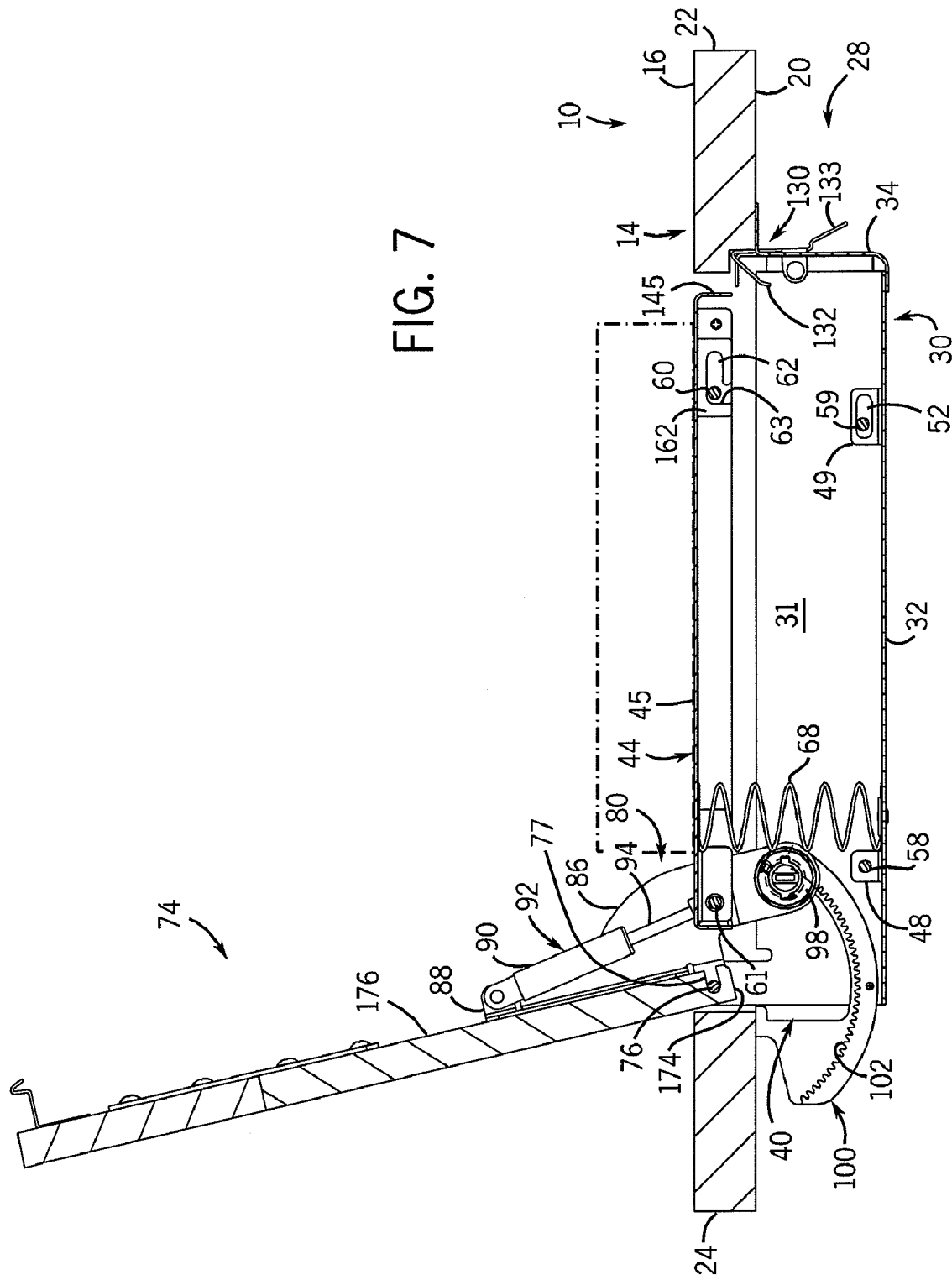
FIG. 7 is a cross-sectional view along line 7-7 of FIG. 5.
Figures 11, 12:
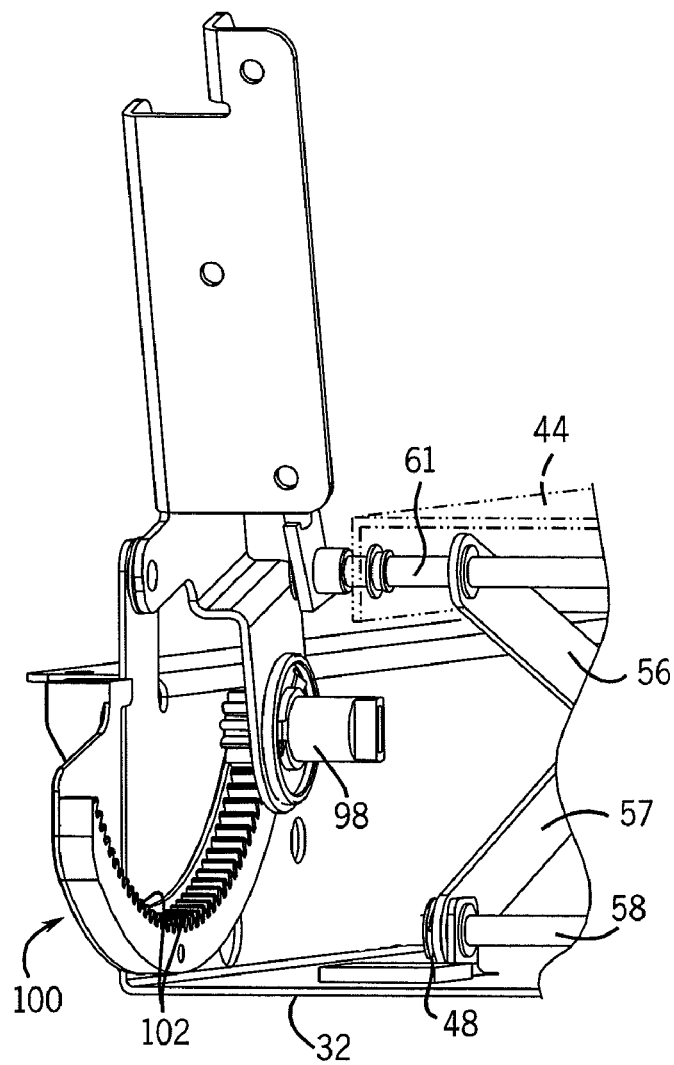
FIG. 11 is a partially broken away, isometric view of a speed control mechanism incorporated in the bin assembly of FIG. 10.
FIG. 12 is a partially broken away, isometric view of a latch mechanism incorporated into the bin assembly of FIG. 10.

As best shown in FIGS. 7, 10, and 11, the movement control system 66 also includes a damper gear 98 secured to one of the hinge brackets 80 at the outermost end of the guide portion 86. The damper gear 98 is rotatably engaged with an arcuate gear strip 100 secured to the enclosure 30 and extending rearwardly through the open rear end 40. The gear strip 100 includes a number of teeth 102 spaced therealong that are engageable with the damper gear 98 to guide the gear 98 and hinge bracket 80 along a predetermined path of travel to control the movement of the cover 74. The damper gear 98 is preferably an oil-filled gear, such that the rotation of the gear 98 is opposed or damped in a manner that restricts the speed of movement of the gear 98 along the gear strip 100. This, in turn, causes the cover 74 to pivot in a controlled manner in both directions and prevents the cover 74 and platform 44 from being quickly moved to either the open or closed configuration by the bias of the gas springs 92 and coil springs 68, thereby avoiding damage to the bin assembly 28.

Figure 2:
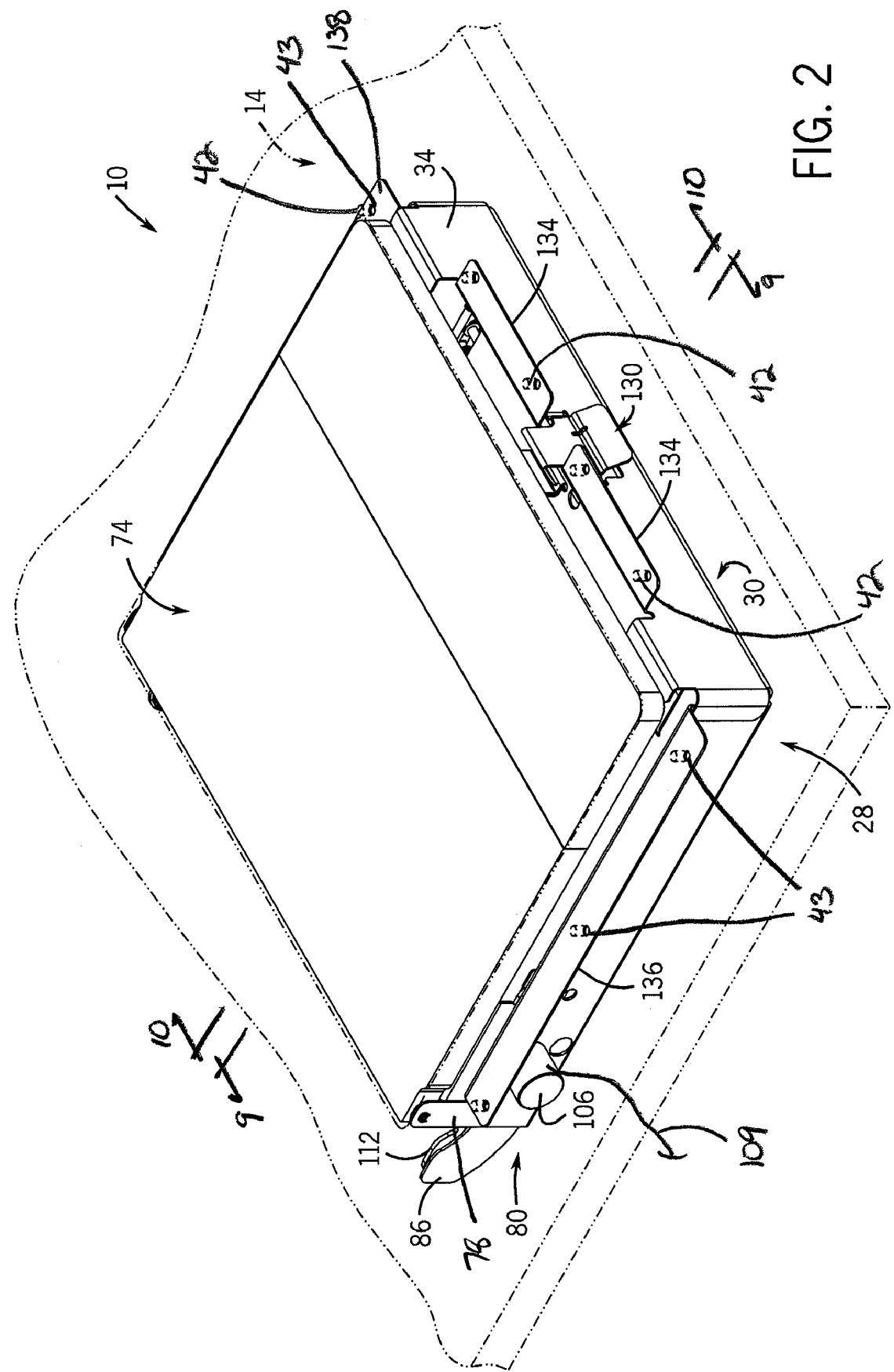
FIG. 2 is an isometric view of the bin assembly of FIG. 1, showing the bin assembly in a closed configuration.

Looking now at FIGS. 6 and 8-9A, opposite the damper gear 98, the guide portion 86 of the hinge bracket 80 includes an opening 104 therein that is alignable with a locking mechanism 106 attached to side wall 36 when the cover 74 is in the closed configuration. The locking mechanism 106 includes a selectively extendable pin 108 that can be selectively extended through the opening 104 in order to prevent the bracket 80 and the cover 74 from being moved from the closed configuration to the open configuration until the locking mechanism 106 is disengaged to retract the pin 108. Preferably, the locking mechanism 106 takes the form of an electronically actuated solenoid such that the locking mechanism 106 can be electronically activated from a remote location via a wire 109 (FIG. 2). Alternatively, the locking mechanism 106 may be activated remotely via a wireless signal. In an arrangement such as this, a single user can lock all bin assemblies 28 in an area against movement. This feature is especially advantageous in a classroom or other instructional environment, when an instructor wishes to ensure that students do not have access to computers contained within the bin assemblies 28.

The bin assembly 28 also includes a gravity lock bracket 110 disposed within the enclosure 30 between the guide portion 86 of the hinge bracket 80 and the gas spring 92 located adjacent the locking mechanism 106. The lock bracket 110 is pivotally affixed to the guide portion 86 by a pin or bolt 111, such that the bracket 110 moves in conjunction with, but is pivotable with respect to, the bracket 80. The lock bracket 110 includes a thickened or weighted end 112 and a locking channel 114 opposite the weighted end 112. The channel 114 is slidably disposed around a stub shaft 116 connected to and extending inwardly from side wall 36, along which the locking channel 114 and lock bracket 110 move as the cover 74 is moved between the closed position toward the open position. The channel 114 includes a locking end 118 within which the stub shaft 116 is positioned when the cover 74 is in the fully open position. In the fully open position, a notch 120 formed in the lock bracket 110 provides clearance for the cover 74, such that the lock bracket 110 can be positioned such that shaft 116 is received within locking end 118, to prevent movement of the cover 74 from the open position toward the closed position. The gravity bias exerted the weighted end 112 maintains the shaft 116 within the locking end 118 of the channel 114 until the lock bracket 110 is manually disengaged. To disengage the lock bracket 110, the weighted end 112 of the lock bracket 110 is pushed toward the cover 74, which pivots the lock bracket 110 and disengages the stub shaft 116 from the locking end 118 of the channel 114. The shaft 116 can then travel along the channel 114 while the cover 74 moves toward the closed position in a normal manner.

Figure 3:
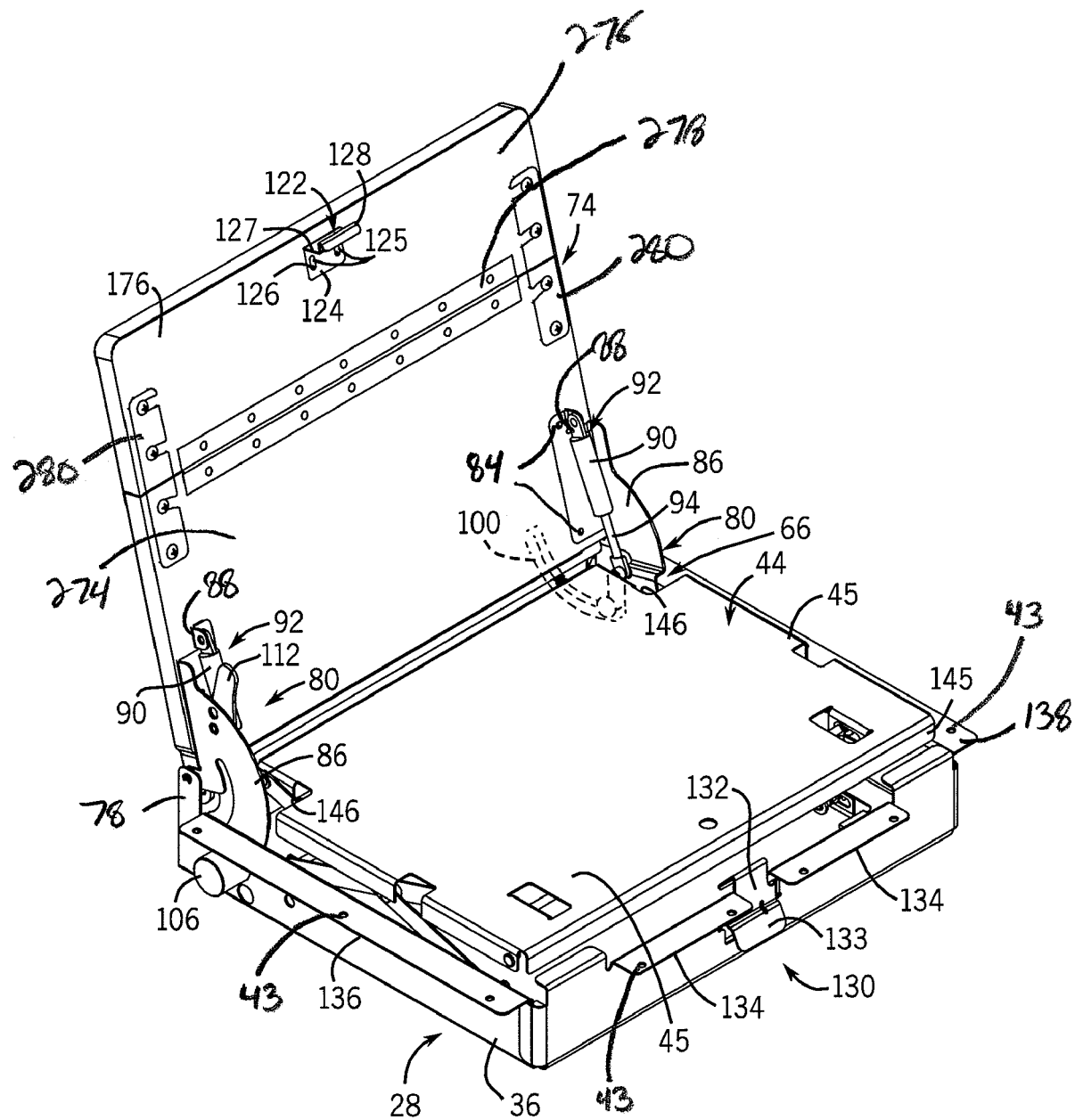
FIG. 3 is an isometric view of the bin assembly similar to FIG. 2, showing the bin assembly in an open configuration.

Referring to FIGS. 3, 10, and 12, the cover 74 includes a latch 122 opposite the rear end 174, which is secured to the lower surface 176 of the cover 74. The latch 122 includes a securing end 124 having bores 125 and attached to the cover 74 by fasteners 126, and a locking end 127 extending downwardly from the securing end 124. The locking end 127 includes a notch 128 opposite the securing end 124 that is engageable with a handle 130 pivotally secured to the front wall 34 of the enclosure 30. The handle 130 includes an engaging end 132 that can be pivoted over the locking end 127 when the cover 74 is in the closed position, and a grasping end 133 disposed opposite the engaging end 132. The grasping end 133 can be pushed towards the enclosure 30 to pivot the engaging end 132 away from the locking end 127 of the latch 122 such that the cover 74 can be moved from the closed position to the open position. The engaging end 132 can be biased toward the locking position by a spring 140 or other biasing member disposed on a shaft 142 to which the handle 130 is pivotally secured. The handle 130 can also include a conventional, e.g., key-operated, locking mechanism (not shown) that prevents the pivoting of the handle 130 until the locking mechanism is disengaged.

The cover 74 is preferably formed as a one-piece member. Alternatively, the cover 74 can be formed with a first section 274 and a second section 276 that are joined by a hinge 278 disposed on the lower surface 176 of the cover 74. The first section 274 is secured to the brackets 80 and is engageable by the lock bracket 110, while the second section 276 includes a latch 122. When the cover 74 is in the open position, the second section 276 can be pivoted about the hinge 278 to position the second section 276 against the first section 274. In this position, the height of the cover 74 is significantly decreased, to provide improved sight lines for the user, e.g. to an instructor at the front of a room. The sections 274 and 276 include a releasable rigid brace 280 that selectively prevents the hinge 278 from operating and secures the sections 274 and 276 to move as a single piece forming the cover 74.

In operation, when latch 122 is released, gas spring assemblies 92 function to move cover 74 to a partially raised position above work surface 10. The user then grasps cover 74 to move cover 74 to the open position. During such movement of cover 74, gas spring assemblies 92 extend and function as a linkage to assist in raising platform 44. When cover 74 is closed, gas spring assemblies 92 compress and function as a linkage in lowering platform 44. Springs 68 counterbalance the weight of a laptop computer or other device supported on platform 44. In combination with damper gear 98, springs 68 provide controlled, smooth movement of cover 74 to the closed position and synchronous lowering of platform 44.

Various alternatives are contemplated as being within the scope of the following claims particularly pointing out and distinctly claiming the subject matter regarded as the invention.

I hereby claim:

1. A bin assembly adapted to be secured to a work surface, the bin assembly comprising:
   a) an enclosure defining an interior, wherein the enclosure is adapted to be secured around an opening in the work surface;
   b) a platform disposed within the enclosure;
   c) a cover configured to enclose the interior of the enclosure that is moveable between a closed position and an open position, wherein the cover in the closed position forms a top wall for the enclosure, and wherein the cover in the open position exposes the interior of the enclosure;
   d) an elevating mechanism connected between the enclosure, the platform and the cover, wherein the elevating mechanism is operable to raise and lower the platform within the enclosure, and
   e) a damping mechanism operably connected between the cover and the enclosure to control the movement of the elevating mechanism in response to movement of the cover between the open and closed positions, wherein the damping mechanism comprises
   a damped gear disposed on one of the cover or the enclosure; and
   a gear strip disposed on the other of the cover or the enclosure and engageable with the gear.

2. A bin assembly adapted to be secured to a work surface, the bin assembly comprising:
   a) an enclosure defining an interior, wherein the enclosure is adapted to be secured around an opening in the work surface;
   b) a platform disposed within the enclosure;
   c) a cover configured to enclose the interior of the enclosure that is moveable between a closed position and an open position, wherein the cover in the closed position forms a top wall for the enclosure, and wherein the cover in the open position exposes the interior of the enclosure; and
   d) an elevating mechanism connected between the enclosure, the platform and the cover, wherein the elevating mechanism is operable to raise and lower the platform within the enclosure wherein the elevating mechanism comprises:
   a first elevating mechanism engaged between the platform and the enclosure, wherein the first elevating mechanism includes a first biasing arrangement for biasing the platform toward a raised position within the enclosure; and
   a second elevating mechanism engaged between the platform and the cover, wherein the second elevating mechanism includes a second biasing arrangement for biasing the cover toward the open position.

3. The bin assembly of claim 2 further comprising a damping mechanism operably connected between the cover and the enclosure to control the movement of the elevating mechanism in response to movement of the cover between the open and closed positions.

4. The bin assembly of claim 2 further comprising a locking mechanism disposed on the enclosure and releasably engageable with the cover for releasably maintaining the cover in the closed position.

5. The bin assembly of claim 4 wherein the locking mechanism is manually actuated.

6. The bin assembly of claim 4 wherein the locking mechanism is electronically actuated.

7. A bin assembly adapted to be secured to a work surface, the bin assembly comprising:
   a) an enclosure defining an interior, wherein the enclosure is adapted to be secured around an opening in the work surface;
   b) a platform disposed within the enclosure;
   c) a cover configured to enclose the interior of the enclosure that is moveable between a closed position and an open position, wherein the cover in the closed position forms a top wall for the enclosure, and wherein the cover in the open position exposes the interior of the enclosure; and
   d) an elevating mechanism connected between the enclosure, the platform and the cover, wherein the elevating mechanism is operable to raise and lower the platform within the enclosure, wherein the elevating mechanism comprises a first elevating mechanism engaged between the platform and the enclosure, and a second elevating mechanism engaged between the platform and the cover, wherein the second elevating mechanism comprises a gas spring.

8. A bin assembly adapted to be secured to a work surface, the bin assembly comprising:
   a) an enclosure defining an interior, wherein the enclosure is adapted to be secured around an opening in the work surface;
   b) a platform disposed within the enclosure;
   c) a cover configured to enclose the interior of the enclosure that is moveable between a closed position and an open position, wherein the cover in the closed position forms a top wall for the enclosure, and wherein the cover in the open position exposes the interior of the enclosure;
   d) an elevating mechanism connected between the enclosure, the platform and the cover, wherein the elevating mechanism is operable to raise and lower the platform within the enclosure; and
   e) a position locking member engageable with the cover to lock the cover in an open position.

9. The bin assembly of claim 8 wherein the position locking member is pivotally secured to the cover at a first location and releasably engageable with the cover at a second location spaced from the first location.

10. The bin assembly of claim 8 wherein the position locking member includes a locking channel that slidably receives therein a guide member disposed on the enclosure.

11. The bin assembly of claim 8 wherein the position locking member is manually disengageable from the cover.

12. The bin assembly of claim 8 wherein the position locking member is weighted at one end.

13. A work surface comprising:
   a) a work support member having an upper surface, a lower surface and an opening extending from the upper surface to the lower surface;
   b) a bin assembly secured around the opening, the bin assembly including an enclosure having a bottom wall and one or more upwardly extending walls that cooperate to define an interior and are secured to the work support member; a platform disposed within the enclosure; a cover pivotally secured to the enclosure and moveable between a closed position and a open position, wherein the cover is coplanar with the upper surface of the work support member in the closed position; and an elevating mechanism connected between the cover and the platform; and
   c) a position locking member pivotally secured to the cover at a first location and releasably engageable with the cover at a second location spaced from the first location, the position locking member including a locking channel that slidably receives therein a guide shaft disposed on the enclosure.

14. The work surface of claim 13 further comprising an elevating mechanism connected between the cover, the platform and the enclosure.

15. A method for selectively concealing an object within a work surface, the method comprising the steps of:
   a) providing a work support surface having an opening; a bin assembly including an enclosure defining an interior and secured around the opening, a platform disposed within the interior of the enclosure; a cover pivotally secured to and above the enclosure, the cover moveable between an open position and a closed position, wherein the cover is coplanar with the work support surface in the closed position; and an elevating mechanism connected between the enclosure, the cover and the platform, wherein the object is disposed on the platform;
   b) selectively moving the cover away from the enclosure to expose the interior of the enclosure and raise the platform; and
   c) selectively replacing the cover over the enclosure to lower the platform and enclose the object on the platform within the enclosure;
   d) wherein the bin assembly further includes a position locking member releasably engageable with the cover in the open position, and further comprising the step of disengaging the position locking member from the cover prior to selectively replacing the cover over the enclosure.

16. The method of claim 15 wherein the bin assembly further includes a locking mechanism disposed on the enclosure and releasably engageable with the cover in the closed position, and further comprising the step of disengaging the locking mechanism prior to selectively removing the cover away from the enclosure.

17. The method of claim 16 wherein the step of disengaging the locking mechanism comprises manually disengaging the locking mechanism.

* * * * *

UNITED STATES PATENT AND TRADEMARK OFFICE
CERTIFICATE OF CORRECTION

PATENT NO.      : 7,578,243 B2
APPLICATION NO. : 11/278896
DATED           : August 25, 2009
INVENTOR(S)     : Steven C. Gevaert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Seventh Day of September, 2010

David J. Kappos
*Director of the United States Patent and Trademark Office*